United States Patent
Lai et al.

(10) Patent No.: US 10,783,163 B2
(45) Date of Patent: Sep. 22, 2020

(54) INSTANCE-BASED DISTRIBUTED DATA RECOVERY METHOD AND APPARATUS

(71) Applicant: Beijing Baidu Netcom Science and Technology Co., Ltd., Beijing (CN)

(72) Inventors: Chunbo Lai, Beijing (CN); Yingfei Xue, Beijing (CN); Pu Wang, Beijing (CN); Bo Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 163 days.

(21) Appl. No.: 15/533,955

(22) PCT Filed: Nov. 27, 2015

(86) PCT No.: PCT/CN2015/095766
§ 371 (c)(1),
(2) Date: Jun. 7, 2017

(87) PCT Pub. No.: WO2017/028394
PCT Pub. Date: Feb. 23, 2017

(65) Prior Publication Data
US 2018/0150536 A1    May 31, 2018

(30) Foreign Application Priority Data
Aug. 20, 2015  (CN) .......................... 2015 1 0515919

(51) Int. Cl.
*G06F 16/00*  (2019.01)
*G06F 16/27*  (2019.01)
*G06F 16/22*  (2019.01)

(52) U.S. Cl.
CPC .......... *G06F 16/27* (2019.01); *G06F 16/2246* (2019.01)

(58) Field of Classification Search
None
See application file for complete search history.

(56) References Cited

U.S. PATENT DOCUMENTS
2015/0169658 A1    6/2015  Goo

FOREIGN PATENT DOCUMENTS
| CN | 101853186 A | 10/2010 |
|----|-------------|---------|
| CN | 104376082 A | 2/2015  |
| CN | 105045917 A | 11/2015 |

OTHER PUBLICATIONS

International Search Report, dated May 18, 2016, for International Application No. PCT/CN2015/095766, 6 pages.

*Primary Examiner* — Bai D Vu
(74) *Attorney, Agent, or Firm* — Seed IP Law Group LLP

(57) ABSTRACT

The present application discloses an instance-based distributed data recovery method. A specific implementation of the method includes: detecting a non-master down node; allocating multiple secondary storage units corresponding to the down node to at least one online node; performing hash grouping on instances stored on logs and allocating the instances to multiple threads; and recovering data of multiple primary storage units in parallel inside the online node. Embodiments of the present invention recover data of a down node in a distributed database in parallel in nodes.

14 Claims, 4 Drawing Sheets

US 10,783,163 B2

INSTANCE-BASED DISTRIBUTED DATA RECOVERY METHOD AND APPARATUS

CROSS-REFERENCE TO RELATED APPLICATION

This application is related to and claims priority from Chinese Application Ser. No. 201510515919.9, filed on Aug. 20, 2015, the entire disclosure of which is hereby incorporated by reference.

TECHNICAL FIELD

The present invention relates to the field of database, and specifically to an instance-based distributed data recovery method and apparatus.

BACKGROUND

With the development of the Internet, distributed databases are more widely used. Accordingly, higher requirements are imposed on the reliability of distributed databases. To reduce the time of service interruption, the data recovery method used when a database cluster node goes down is of great importance. Currently, a distributed data recovery method used in the industry are to allocate data of the down node to multiple online nodes for recovery, where one single thread is used inside each node, or multi-thread recovery is implemented after performing heavy operations such as sorting log records. The use of such methods to recover data obviously have the disadvantages of low recovery efficiency of data in the down node and low node utilization ratio.

SUMMARY

Embodiments of the present invention provide an instance-based distributed data recovery method, so that when a distributed database system goes down, parallel data recovery can be performed, thereby improving the data recovery efficiency and the node utilization ratio, and improving the availability of the database system.

A first aspect of the present application provides an instance-based distributed data recovery method, comprising:

detecting a non-master down node; allocating multiple secondary storage units corresponding to the down node to at least one online node; performing hash grouping on instances stored on logs and allocating the instances to multiple threads; and recovering data of multiple primary storage units in parallel inside the online node.

In an exemplary implementation of the first aspect of the present application, indexes of the secondary storage unit are stored in a tertiary storage unit, each of the multiple secondary storage units stores indexes of the multiple primary storage units, each of the multiple primary storage units stores one instance, the data stored in the multiple primary storage units is ordered according to the instances, a master node and non-master nodes together constitute nodes in a cluster, each of the non-master nodes manages the primary storage units indexed by the secondary storage units, and the master node manages the tertiary storage unit and the secondary storage units.

In addition, during the data recovery process, logs of same instances are mapped to a same thread by means of hash grouping, so as to allocate the logs to the multiple threads according to the different instances. The at least one online node performs logical recursion in its process according to content of the log to recover data. After the at least one online node completes the data recovery, the management node of the secondary storage units is changed to the online node that executes the recovery operation.

A second aspect of the present application provides an apparatus, comprising a master node device and a non-master node device, wherein the master node device is configured to manage a master node, and the non-master node device is configured to manage a non-master node.

In an exemplary implementation of the second aspect of the present application, the master node device comprises: a detection module, configured to detect a non-master down node; and an allocation module, configured to allocate multiple secondary storage units corresponding to the down node to at least one online node.

In addition, the non-master node device comprises: a receiving module, configured to receive information about the multiple secondary storage units corresponding to the down node that are allocated to the non-master node; a scanning module, configured to scan a log of the down node; and a processing module, configured to map logs of same instances to a same thread of the multiple threads by means of hash grouping.

The allocation module is further configured to change the management node of the secondary storage units to the online node that executes the recovery operation, after the at least one online node completes the data recovery. The receiving module is further configured to receive a network address and a port name of the down node.

The present application has the following beneficial effects: When a node goes down, hash grouping is performed on instances stored on logs, and the instances are allocated to multiple threads, so that the online node recovers data in parallel. Whereby, the data recovery efficiency and the node utilization ratio are improved.

DETAILED DESCRIPTION OF EMBODIMENTS

The present invention provides an instance-based distributed data recovery method. Preferred embodiments of the present application will be described below in combination with the accompanying drawings. It should be appreciated that the preferred embodiments described herein are merely used for explaining the relevant invention, rather than limiting the invention. In addition, it should be noted that the embodiments in the present application and the features in the embodiments may be combined with each other on a non-conflict basis.

Figure 1:
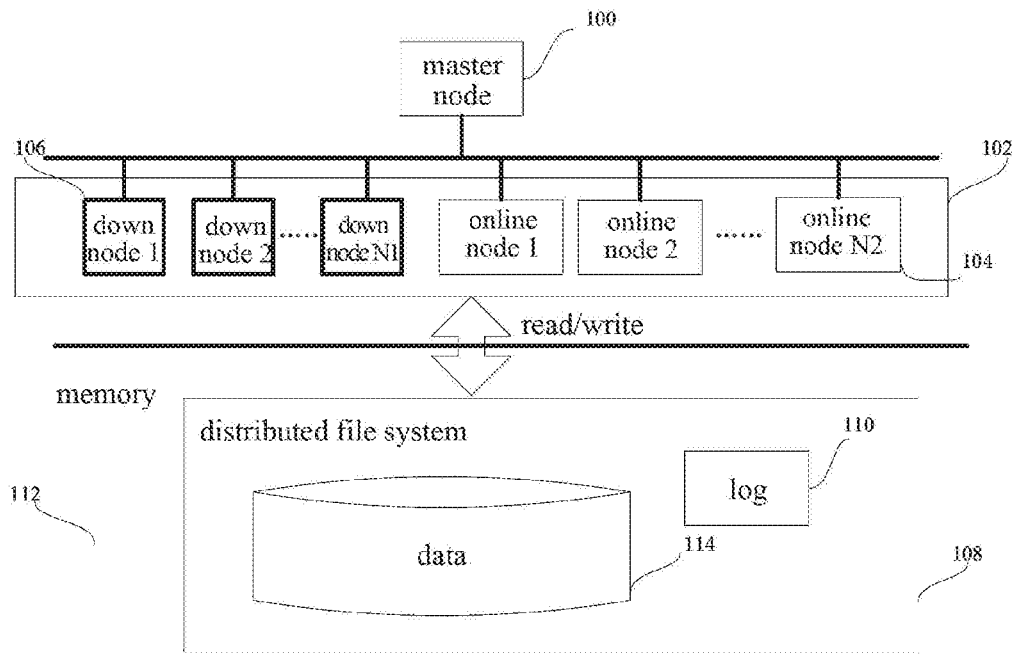
FIG. 1 is an architectural diagram of a distributed data system according to an embodiment of the present invention.

FIG. 1 is an architectural diagram of a distributed data system according to an embodiment of the present invention. However, it should be appreciated that the embodiments of the present invention are not limited to the architecture shown in FIG. 1.

In this embodiment, a database cluster includes two types of nodes: master node 100 and non-master node 102. In a cluster, generally one master node 100 is configured. In another implementation, multiple standby master nodes may be configured, but only one master node is in active mode. As can be seen from FIG. 1, the cluster further includes multiple non-master nodes 102. When the database system operates in a normal state, the multiple nodes are all running online, and therefore are referred to as online nodes, as denoted by the reference numeral 104 in FIG. 1. In a distributed database, there may be a node going down at any time. In this case, the non-master nodes 102 include N1 (1≤N1<N2) down nodes 106 and N2 (N1<N2<N, where the total number of non-master nodes is N) online nodes 104. The master node 100 and the non-master nodes 102 jointly manage data in the database. In the distributed database, data exists in a file form in a distributed file system 108, and the file system 108 is persistently stored in a memory 112. A node may perform read/write operations on data 114 in the file system 108. A log 110 in the file system 108 records all modifications (including addition, deletion, etc.) made by nodes to the data. Therefore, the distributed file system is shared by the nodes.

Figure 2:
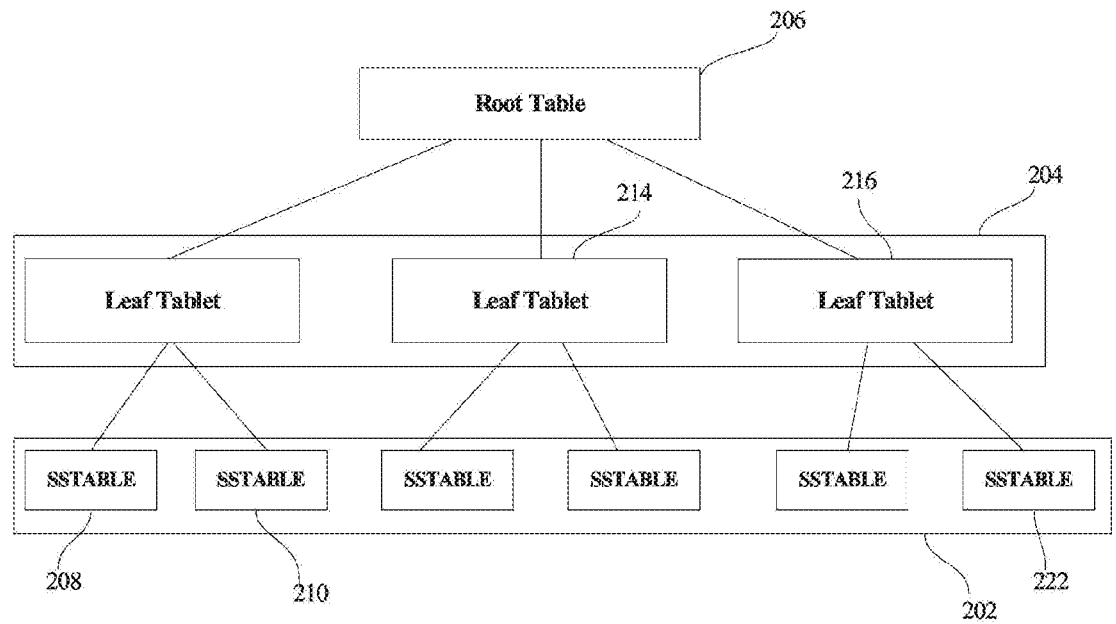
FIG. 2 is a block diagram of an instance-based data storage structure according to an embodiment of the present invention.

FIG. 2 is a block diagram of an instance-based data storage structure according to an embodiment of the present invention. In this embodiment, the technical implementation is based on the storage of instances. Specifically, the instance may be a storage object, for example, a machine name (such as server names), a program name, etc. In addition, the database is a three-layer storage structure, where the instances are stored in a primary storage unit (such as SSTABLE) 202. The other two layers are secondary storage units (such as Leaf Tablet) 204 and tertiary storage units (such as Root Tablet) 206 respectively.

Optionally, the database storage structure includes multiple primary storage units 202. The primary storage unit 202 may be the smallest unit of storage in the database, and data in each primary storage unit 202 is ordered according to primary keys. The instance name is included in the primary key as part of the primary key, and therefore the stored data is ordered according to the instances. In addition, each primary storage unit 202 stores data of only one instance, and each primary storage unit 202 has a unique sequence number. The database storage structure may further include multiple secondary storage units 204, and the secondary storage unit 204 may be the smallest unit of storage of metadata of the master node 100 of the cluster. Each secondary storage unit 204 stores indexes of the primary storage units 202 that are ordered according to the primary keys. In addition, the database storage structure may further include one or more tertiary storage units 206. The tertiary storage units 206 are used for indexing the secondary storage units 204, and store therein indexes pointing to the secondary storage units 204, the indexes being ordered according to the primary keys.

Further, in the cluster provided in this embodiment of the present invention, the non-master nodes 102 manage the primary storage units 202, where each non-master node 102 manages one or more primary storage units 202 indexed by a secondary storage unit 204. One secondary storage unit 204 cannot be managed across nodes, that is, the primary storage units 202 indexed by one secondary storage unit 204 can only be managed by one non-master node 102. Specifically, as shown in FIG. 2, the primary storage units 208 and 210 cannot be managed by two different non-master nodes. In addition, one primary storage unit cannot by indexed by two different secondary storage units at the same time. Specifically, as shown in FIG. 2, the primary storage unit 212 cannot be indexed by the secondary storage units 214 and 216 at the same time. The master node 100 manages the secondary storage units 204 and the tertiary storage units 206.

Figure 3:
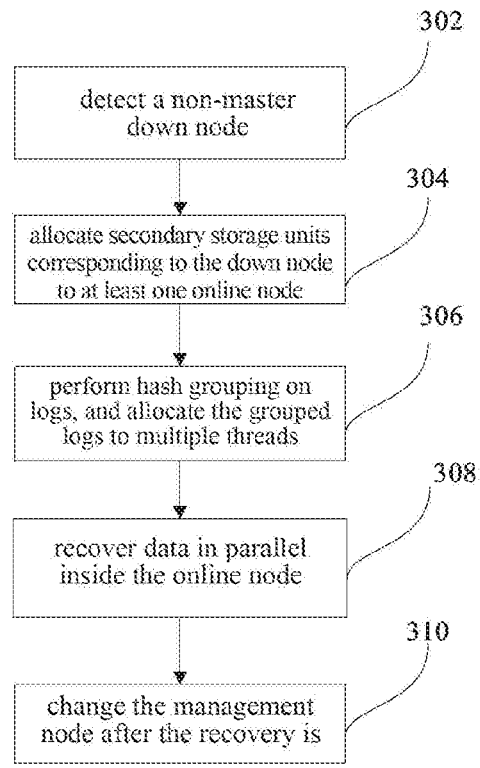
FIG. 3 is a flow chart of data recovery in an instance-based distributed data recovery method according to an embodiment of the present invention.

FIG. 3 is a flow chart of data recovery in an instance-based distributed data recovery method according to an embodiment of the present invention. In an embodiment of the present invention, at a moment, a node in the cluster goes down. According to the method provided in the present invention, data recovery may include the following steps.

At step 302, a master node 100 detects a down node.

According to an embodiment of the present invention, that is, the exemplary database storage structure shown in FIG. 2, the master node 100 manages the secondary storage units 204 that index the multiple primary storage units 202 managed by the down node 106. In this implementation, the master node 100 allocates the secondary storage units corresponding to the multiple primary storage units managed by the down node 106 to at least one online node 104, as described in step 304.

According to the above descriptions, one non-master node 102 may correspond to multiple secondary storage units 202. In an implementation, to ensure the data recovery efficiency, when performing step 304, the master node 100 evenly allocates the multiple secondary storage units 202 corresponding to the down node 106 to multiple online nodes 104. In another implementation, the log of each node is stored in a directory named with the network address and port of the node. While allocating the secondary storage units 204 to the online nodes 104, the master node 100 notifies the online nodes of the network address and port of the down node 106 to be recovered. In this way, the online node 104 may find a log area corresponding to the down node 106 in the log.

At step 306, hash grouping is performed on logs, and the grouped logs are allocated to multiple threads.

At step 308, after the hashing grouping and the thread allocation are completed, data recovery is performed in parallel by using multiple threads inside the online node 104.

Further, in some implementations, the multiple online nodes 104 perform therein logical recursion for the operation of the down node 106 according to content stored in the log by means of the allocated multiple threads.

In an implementation, after the online nodes 104 complete the data recovery, the master node may re-configure, in the tertiary storage unit 206, a correspondence for the secondary storage units originally corresponding to the down node 106, and map the secondary storage units to the corresponding online nodes, as described in step 310.

Figure 4:
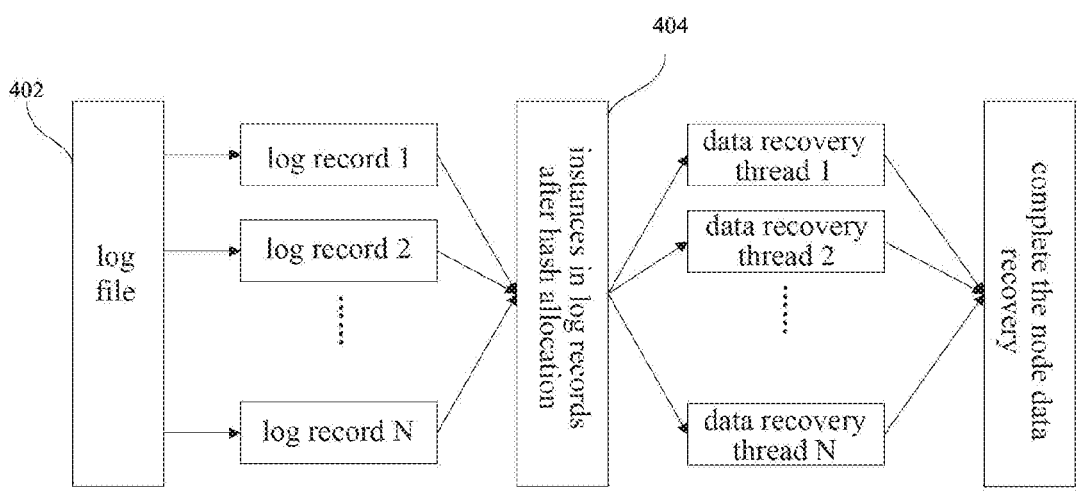
FIG. 4 is a schematic diagram illustrating a hash grouping process during the data recovery process in an instance-based distributed data recovery method according to an embodiment of the present invention.

FIG. 4 is a schematic diagram illustrating a hash grouping process during the data recovery process in an instance-based distributed data recovery method according to an embodiment of the present invention. In this embodiment of the present invention, during the data recovery process, after the online node 104 finds a storage location 402 of the logs of the node according to the network address and port of the down node 106, the online node scans the log file piece by piece. Because each log record stores information about the secondary storage unit 204, the online node may find logs that need to be recovered by it during the log scanning process, and each time a matching log is found, perform hash grouping on the log.

Specifically, in an implementation, the hash grouping method at step 404 may be as follows. Instance names recorded in the log records are converted according to the storage form of the instances. In this embodiment, the instance may be a machine name, a program name, etc., and is equivalent to a character string. The character string may be converted into ASCII codes. Then, the obtained ASCII codes are summed, to obtain a sum which is a 32-bit integer value. Afterwards, a modulo operation is performed on the number of recovery threads by using the value, to obtain a thread ID of a thread for recovering the instance. Because the instance name is unique, the corresponding thread ID is also unique. That is, through such conversion, each instance corresponds to a unique thread. Therefore, the logs of the down node 106 can be mapped to multiple parallel data recovery threads according to the instances.

A second aspect of the present application provides an instance-based distributed database data recovery apparatus. The apparatus includes a master node device and a non-master node device.

Figure 5:
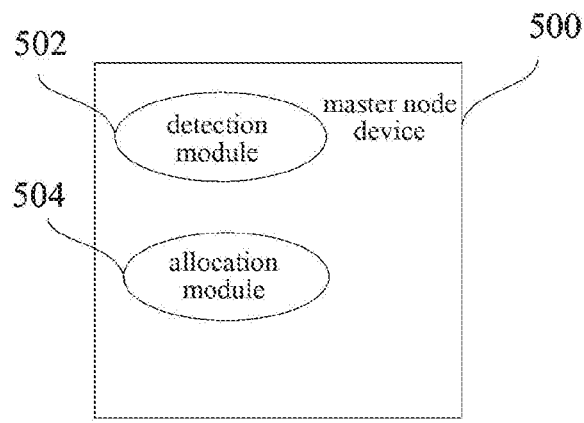
FIG. 5 is an exemplary block diagram of a master node device according to an embodiment of the present invention.

FIG. 5 is an exemplary block diagram of a master node device according to an embodiment of the present invention. Optionally, the master node device 500 includes a detection module 502 and an allocation module 504. In an implementation, the detection module 502 is configured to detect a non-master node 102 that goes down. The allocation module 504 is configured to allocate multiple secondary storage units 204 corresponding to the down node 106 to at least one online node 104. In another implementation, the allocation module 504 provided may be further configured to change the management node of the secondary storage units 204 to the online node 104 that executes the recovery operation, after the online node 104 completes the data recovery.

Figure 6:
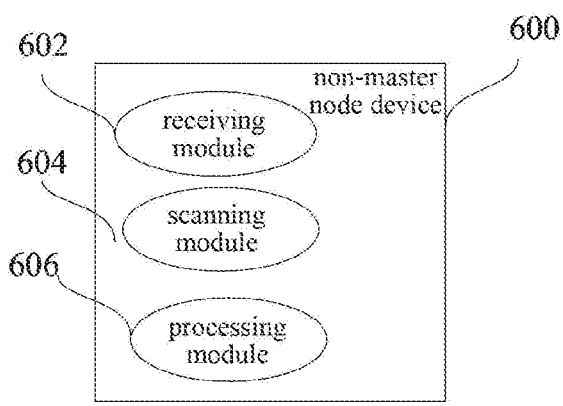
FIG. 6 is an exemplary block diagram of a non-master node device according to an embodiment of the present invention.

FIG. 6 is an exemplary block diagram of a non-master node device according to an embodiment of the present invention. Optionally, the non-master node device 600 includes: a receiving module 602, a scanning module 604, and a processing module 606.

In an implementation, the receiving module 602 is configured to receive information about the multiple secondary storage units 204 corresponding to the down node 106 that are allocated to the non-master node. The scanning module 604 is configured to scan a log of the down node. The processing module 606 is configured to map logs 110 of same instances to a same thread of the multiple threads by means of hash grouping. In another implementation, the receiving module 602 provided is further configured to receive a network address and a port name of the down node 106, so that the online node 104 used for data recovery finds, in the file system 108, an area where the log 110 of the down node 106 is stored, according to the received network address and a port name.

It should be appreciated by those skilled in the art that all or some of the steps of the method in the above embodiments may be implemented by a computer program instructing relevant hardware. The program may be stored in a computer readable storage medium. When the program is run, the flow of the method in the embodiments is performed.

Figure 7:
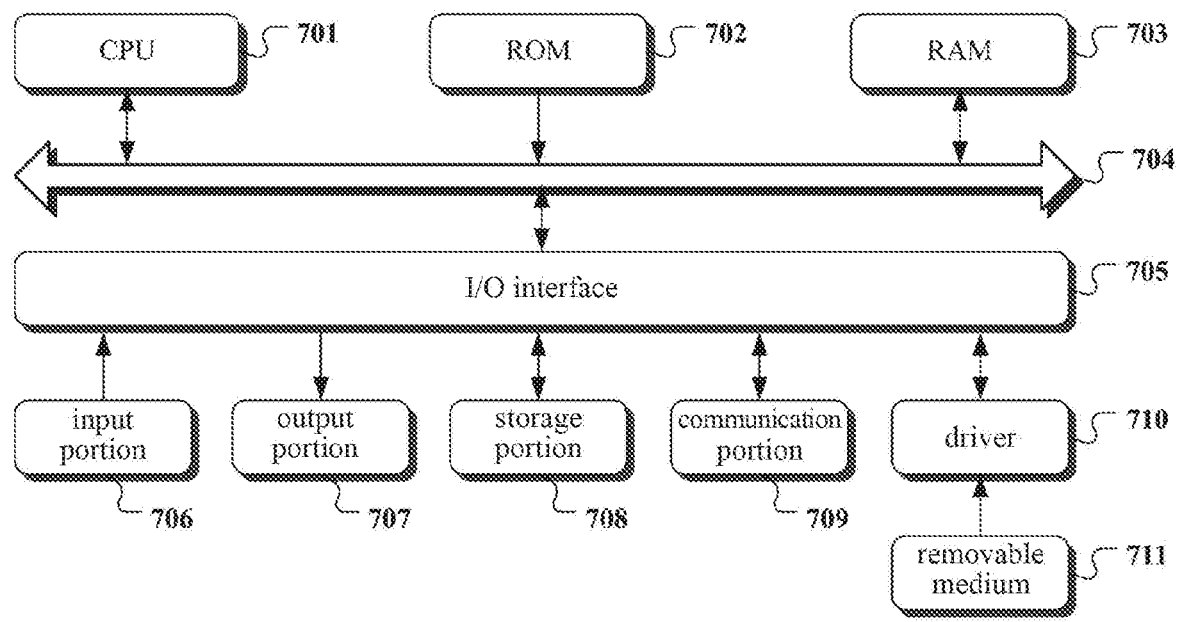
FIG. 7 is a schematic structural diagram of a computer system according to an embodiment of the present invention.

Referring to FIG. 7, a schematic structural diagram of a computer system 700 adapted to implement a device of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711.

The flow charts and block diagrams in the accompanying drawings illustrate architectures, functions and operations that may be implemented according to the systems and methods of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present application further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The programs are executed by one or more processors to implement the methods of the present application.

The description of the present disclosure is a best mode intended to teach the person skilled in the art to implement the present invention, nut not to limit the scope of the present invention. Any equivalent modification of the claims in the present disclosure, is within the scope of the present disclosure.

What is claimed is:

1. An instance-based distributed data recovery method for a distributed data system, the distributed data system comprising a database cluster that includes at least one master node and a plurality of non-master nodes, and a distributed file system that includes a database including multiple primary storage units and multiple secondary storage units, wherein, during normal operation when the master node and the non-master nodes are all running online, the primary storage units are managed by respective ones of the plurality of non-master nodes and the multiple secondary storage units are managed by the master node, and wherein each of the multiple secondary storage units stores indexes of multiple primary storage units, and each of the multiple primary storage units stores one instance, the method comprising:

detecting, by the master node, one of the non-master nodes going down;

allocating, by the master node, multiple secondary storage units that index multiple primary storage units managed by the non-master node that is going down to at least one online node, an online node being a non-master node that remains online;

performing, by the online node to which the multiple secondary storage units have been allocated by the master node, hash grouping on instances stored on logs of the non-master node that is going down and allocating the instances to multiple threads inside the online node; and recovering, by the online node, data of the multiple primary storage units managed by the non-master node that is going down in parallel in the multiple threads.

2. The method according to claim 1, wherein indexes of the secondary storage unit are stored in a tertiary storage unit, and the data stored in the multiple primary storage units is ordered according to the instances.

3. The method according to claim 2, wherein the master node manages the tertiary storage unit and the secondary storage units.

4. The method according to claim 1, wherein the multiple secondary storage units corresponding to the non-master node that is going down are evenly allocated to the at least one online node.

5. The method according to claim 1, wherein the performing, by the online node, hash grouping on instances stored on logs of the non-master node that is going down and allocating the instances to multiple threads inside the online node comprises: performing hash grouping on the instances stored on the logs to map logs of same instances to a same thread of the multiple threads, so as to allocate the logs to the multiple threads according to the different instances.

6. The method according to claim 5, wherein the hash grouping step is: converting an instance name recorded in a log record to convert each character of the character string into an ASCII code, and summing the ASCII codes to obtain a sum which is a 32-bit integer value; and performing a modulo operation on the number of recovery threads by using the value, to obtain a thread ID of a thread for recovering the instance.

7. The method according to claim 1, wherein the at least one online node performs logical recursion in an own process according to content of the log to recover data.

8. A device, comprising:

a processor; and a memory, storing computer readable instructions thereon, the computer readable instructions when executed by the processor, causing the processor to:

detect, by a master node, a non-master node that is going down;

allocate, by the master node, multiple secondary storage units that index multiple primary storage units managed by the non-master node that is going down to at least one online node, an online node being a non-master node that remains online, wherein a distributed data system comprises a database cluster that includes at least one master node and a plurality of non-master nodes, and a distributed file system that includes a database including multiple primary storage units and multiple secondary storage units, wherein, during normal operation when the master node and the non-master nodes are all running online, the primary storage units are managed by respective ones of the plurality of non-master nodes and the multiple secondary storage units are managed by the master node, and wherein each of the multiple secondary storage units stores indexes of multiple primary storage units, and each of the multiple primary storage units stores one instance;

perform, by the online node to which the multiple secondary storage units have been allocated by the master node, hash grouping on instances stored on logs of the non-master node that is going down and allocate the instances to multiple threads inside the online node; and recover, by the online node, data of multiple primary storage units managed by the non-master node that is going down in parallel in the multiple threads.

9. The device according to claim 8, wherein indexes of the secondary storage unit are stored in a tertiary storage unit and the data stored in the multiple primary storage units is ordered according to the instances.

10. The device according to claim 9, wherein the master node manages the tertiary storage unit and the secondary storage units.

11. The device according to claim 8, wherein the multiple secondary storage units corresponding to the non-master node that is going down are evenly allocated to the at least one online node.

12. The device according to claim 8, wherein the perform, by the online node, hash grouping on instances stored on logs of the non-master node that is going down and allocating the instances to multiple threads inside the online node comprises: performing hash grouping on the instances stored on the logs to map logs of same instances to a same thread of the multiple threads, so as to allocate the logs to the multiple threads according to the different instances.

13. The device according to claim 12, wherein the hash grouping step is: converting an instance name recorded in a log record to convert each character of the character string into an ASCII code, and summing the ASCII codes to obtain a sum which is a 32-bit integer value; and performing a modulo operation on the number of recovery threads by using the value, to obtain a thread ID of a thread for recovering the instance.

14. A non-transitory computer storage medium storing computer readable instructions, the computer readable instructions when executed by a processor, causing the processor to:
- detect, by a master node, a non-master node that is going down;
- allocate, by the master node, multiple secondary storage units that index multiple primary storage units managed by the non-master node that is going down to at least one online node, an online node being a non-master node that remains online, wherein a distributed data system comprises a database cluster that includes at least one master node and a plurality of non-master nodes, and a distributed file system that includes a database including multiple primary storage units and multiple secondary storage units, wherein, during normal operation when the master node and the non-master nodes are all running online, the primary storage units are managed by respective ones of the plurality of non-master nodes and the multiple secondary storage units are managed by the master node, and wherein each of the multiple secondary storage units stores indexes of multiple primary storage units, and each of the multiple primary storage units stores one instance;
- perform, by the online node to which the multiple secondary storage units have been allocated by the master node, hash grouping on instances stored on logs of the non-master node that is going down and allocate the instances to multiple threads inside the online node; and
- recover, by the online node, data of multiple primary storage units managed by the non-master node that is going down in parallel in the multiple threads.

* * * * *